June 15, 1965  O. SUTER  3,189,909
TACHOMETER
Filed Dec. 4, 1961  3 Sheets-Sheet 1

INVENTOR.
OSWALD SUTER
BY FULWIDER, MATTINGLY
& HUNTLEY

ATTORNEYS

June 15, 1965　　　O. SUTER　　　3,189,909
TACHOMETER
Filed Dec. 4, 1961　　　　　　　3 Sheets-Sheet 2
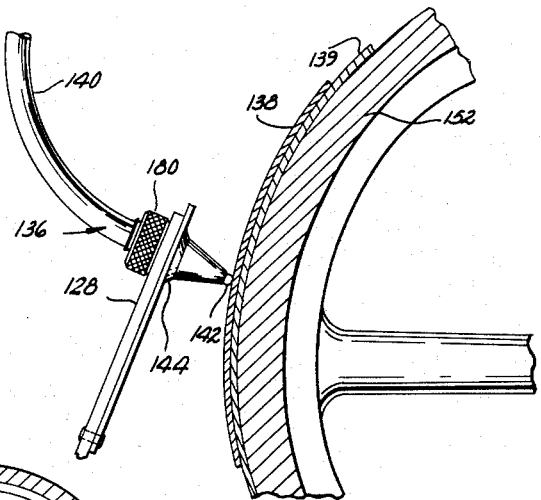
FIG. 2
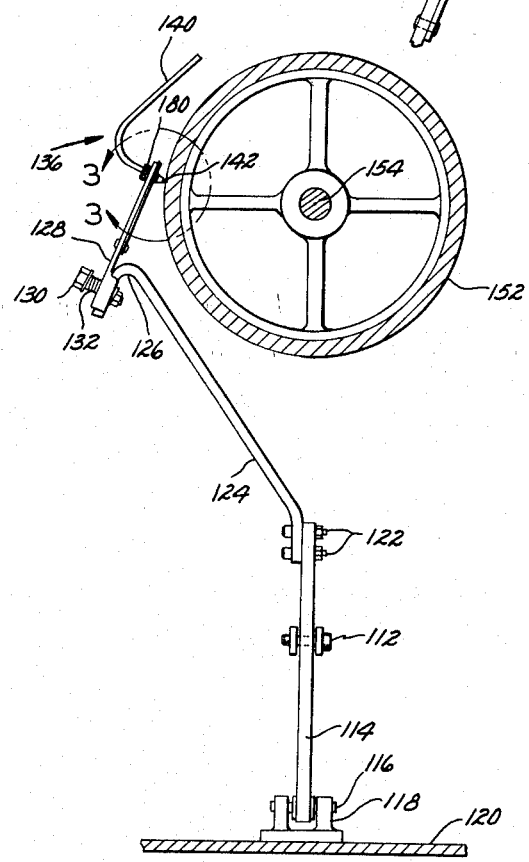
FIG. 3
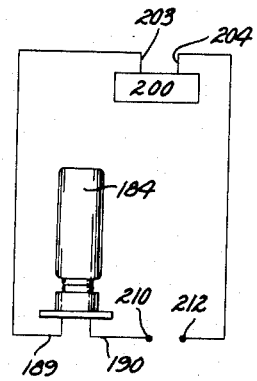
FIG. IA
INVENTOR.
OSWALD SUTER
BY FULWIDER, MATTINGLY
& HUNTLEY
ATTORNEYS June 15, 1965  O. SUTER  3,189,909
TACHOMETER
Filed Dec. 4, 1961  3 Sheets-Sheet 3
FIG. 4
FIG. 5
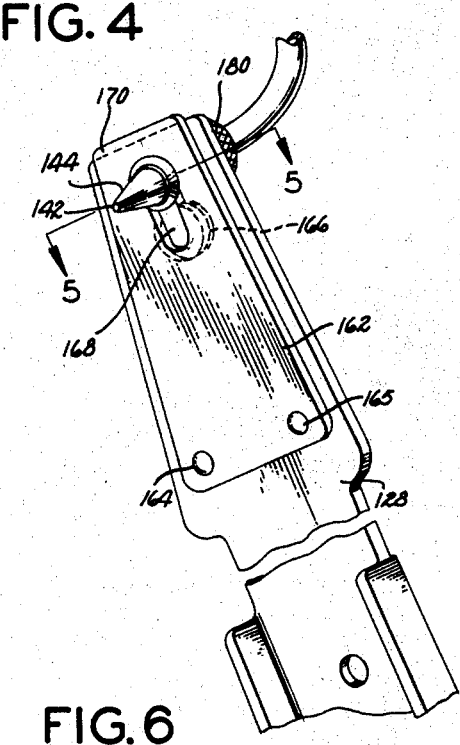
FIG. 6
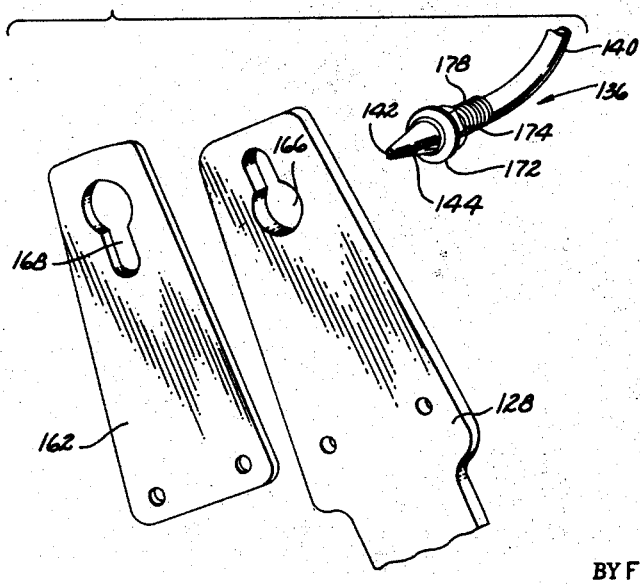
INVENTOR.
OSWALD SUTER
BY FULWIDER, MATTINGLY
& HUNTLEY
ATTORNEYS United States Patent Office 3,189,909
Patented June 15, 1965

3,189,909
TACHOMETER
Oswald Suter, Los Angeles, Calif., assignor to Technical Oil Tool Corporation, Los Angeles, Calif., a corporation of California
Filed Dec. 4, 1961, Ser. No. 156,779
10 Claims. (Cl. 346—18)

This invention relates generally to tachometers for measuring the rotational speed of rotating shafts and the like bodies, and more particularly relates to recording tachometers in which the movable means for making the record on a chart requires more than the usual actuating force for its movement. An example of the latter type of recording tachometer is one in which the graphical record is made by moving a scribe or stylus in contact with the chart sufficiently forcefully to make a direct original record and simultaneously to make a carbon copy on an underlying duplicate chart. Recording tachometers of this kind are particularly useful for making records of rotary table and drilling fluid pumps speeds in connection with apparatus for recording bore hole drilling operations, such as disclosed in the inventors' copending application Sedial No. 688,643, filed October 7, 1957, now Patent No. 3,076,966.

Heretofore, tachometers of conventional design, by reason of their usual delicacy of construction and sensitivity to rough treatment and also by reason of the very limited forces usually available for their recording movements, have been unsuited to direct recording operations where considerable frictional force is required to be exerted by the pen, stylus, or other marking means upon the chart or the like record medium.

It is, accordingly, an object of this invention to provide a tachometer device of improved ruggedness, durability, and simplicity of design.

It is another object of this invention to provide a tachometer capable of accurate measurements regardless of whether relatively high frictional forces are involved in the measuring or recording mechanism.

It is still a further object of this invention to furnish a recording tachometer which has an abundance of power available for operation of the record making mechanism, and which is not dependent upon any external energy for its operation other than that derived from the rotating body, the speed of which is being measured.

The objects of this invention are attained in general by apparatus which employs a fluid pump adapted to be positively driven by the rotating body, the speed of rotation of which is to be measured, to produce a fluid pressure against a flow resistance means, which pressure is a predetermined function of the rate of rotation of the body, and utilizing such fluid pressure forcefully to move a pen, stylus, or the like marking means in frictional contact with a record medium to make a record indicative of such rate of rotation.

These and other objects, advantages, and features of novelty will be evident hereinafter.

In the drawings which illustrate a preferred embodiment and mode of operation of the invention and in which like reference characters designate the same or similar parts throughout the several views:

FIGURE 1A is a wiring diagram for the electrical circuitry of FIGURE 1.

FIGURE 2 is a partial, cross sectional view taken on line 2—2 of FIGURE 1 showing a portion of the tachometer recording apparatus.

FIGURE 3 is an enlarged detail view of the portion of the apparatus indicated at 3—3 in FIGURE 2.

FIGURE 4 is an enlarged fragmentary detail view in perspective of a portion of the stylus holder of the recording apparatus of FIGURES 2 and 3.

FIGURE 5 is an enlarged fragmentary detail view taken on line 5—5 of FIGURE 4.

FIGURE 6 is an enlarged detail exploded view of the apparatus of FIGURE 5.

*Apparatus*

Figure 1:
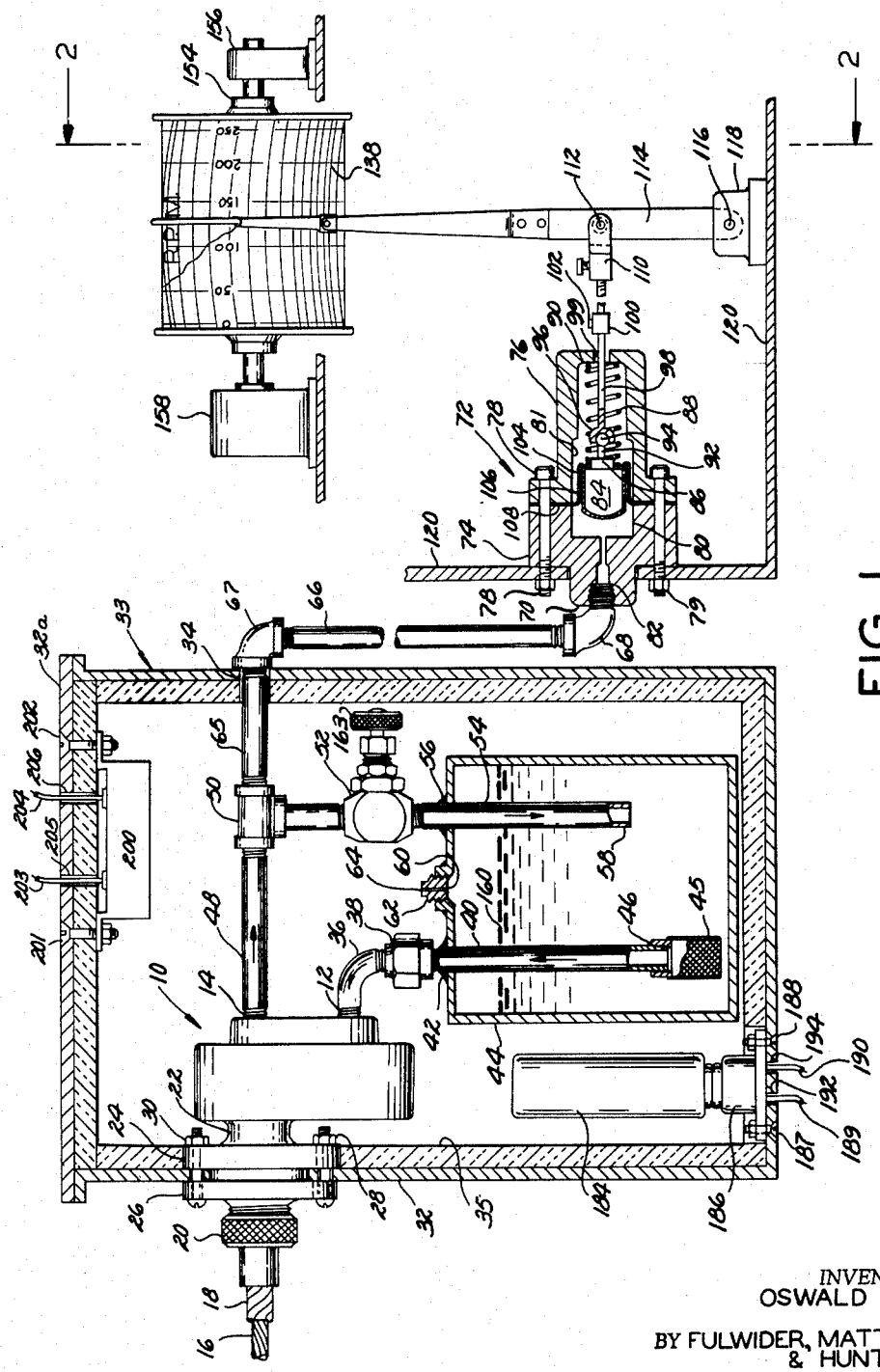
FIGURE 1 is an elevational view, partly in section, of a general assembly of the tachometer apparatus of the invention.

Referring now to the drawings, 10 is a fluid pump preferably, although not necessarily, of a positive displacement rotary type, such pump having an inlet connection at 12 and a discharge connection at 14. Provision is made for driving the pump 10 through a conventional flexible drive means adapted to be connected to a shaft or the like rotating body, the speed of rotation of which is to be measured. Such flexible drive means comprises a flexible shaft 16 extending through a flexible housing 18, the latter making coupling connection at 20 with the drive shaft housing 22 of the pump. The drive shaft housing 22 of the pump is provided with an integral flange 24 which together with a separate adjacent annular flange 26 makes bolted connection by means of a plurality of flange bolts, two of which are shown at 28 and 30, with wall member 32 of an enclosure 33 hereinafter more fully described. The inner end of the flexible shaft 16 makes coupling engagement with the pump drive shaft within the pump shaft housing 22 by suitable means, not shown.

The inlet 12 of the pump 10 is connected through an elbow 36 and union 38 to a tubular riser 40 which extends, as shown at 42, into a fluid reservoir 44. The lower end 46 of the riser 40 is provided with a suitable strainer or filter 45 which is positioned adjacent the bottom of the reservoir.

The discharge connection 14 of the pump 10 is connected through pipe 48 to one end of a T connection 50 and from the side branch connection thereof through a valve 52 to a tubular riser 54 which extends, as shown at 56, into the reservoir 44, the lower end 58 of such riser being preferably, although not necessarily, positioned intermediate the top and bottom of the reservoir. The reservoir 44 is provided at the top, intermediate the riser tubes 40 and 54, with a threaded filler opening 60 which is normally closed with a plug 62 through which a pressure equalizer vent duct 64 is provided.

The end of the T connection 50 opposite the pump discharge pipe 48 makes connection through pipe 65, which extends out of the enclosure 33 through an opening 34 therein and thence through elbow 67, tubing 66, and elbow 68 with the inlet 70 of a pressure actuator unit, shown generally at 72. Such actuator unit may have a construction which is the same or similar to that of the actuator unit, shown at 110, in the hereinbefore mentioned copending application Serial No. 688,643.

As shown herein in FIGURE 1, the actuator body is composed of a head 74 and a cylindrical body member 76 bolted coaxially to the head 74 by a plurality of circumferentially spaced apart head bolts which also pass through a supporting member 120, as shown at 78 and 79. The head 74 is formed with an internal, coaxial bore 80 which communicates wtih the before mentioned inlet 70 by means of a central duct 82, and the body member is formed with a bore 81, the forward position of which forms a coaxial extension of the head bore 80. Coaxially positioned within the bore 81 of actuator 72 adjacent the joining connection between the head 74 and the body member 76 and extending into the bore 80 is a dome-shaped plunger 84. The rear end portion of the plunger 84 which extends into the bore of the cylindrical portion 76 is formed with a short coaxial section 86 of reduced diameter which acts as an annular retainer seat for one end of a helical spring 88. The helical spring 88 normally extends under compression between the before mentioned annular retainer seat 86 of the plunger 84 and the inside opposite end surface 90 of the bore of the cylindrical body member 76, and urges the plunger member 84 toward the head end of the bore 80.

Extending coaxially from the end of extension 85 of the plunger 84 is a ball joint element consisting of a short neck 92 carrying on the outer end thereof an integral ball 94. A socket member 96 makes flexible grasping connection with the ball 94 and carries integral therewith a coaxial plunger rod which extends out of the end of the cylindrical body member 76 through a coaxial central aperture 99 having substantial diametrical clearance around the aforesaid rod 98. A stop member 100 is adjustably set on the piston rod 98 by means of a set screw 102 and serves to limit the inward movement of the plunger rod 98 and the plunger 84 toward the head end of bore 80.

Contained within the bore 80 of the head 74 and within the adjoining bore 81 of the interior of the cylindrical body portion 76 of the actuator 72 is a flexible resilient bellows 104 formed with a closed ended, central, cup-shaped portion fitting over the rounded end of the plunger 84. The opposite open end portion of the cup-shaped portion of the bellows is folded back upon itself to form an outer peripheral wall portion, as shown at 106, which fits within the annular clearance space between the plunger 84 and surrounding bore 81 of the cylindrical portion 76, and extends toward the head 74 to an outwardly flared terminal portion 108. The flared terminal portion 108 is gripped in sealing engagement between the juxtaposed annular end portions of the head 74 and cylindrical body 76 by means of the before mentioned head bolts of the actuator, shown at 78 and 79.

The plunger rod 98 is threadedly connected to the end of a clevis 110 which is pin connected at 112 to an intermediate portion of a lever arm 114, the lower end of which is, in turn, pivotally mounted for limited angular motion upon a pivot pin 116 supported in a bearing block 118. The bearing block 118 may be attached to the floor of an instrument housing which also may serve as part of the before mentioned support 120, to which the head 74 of the actuator 72 is bolted.

Bolted at 122 to the top end of the lever arm 114 is a lever arm extension 124, the upper end of which is curved outwardly and downwardly, as shown at 126, to receive on the outer downwardly directed face thereof a resiliently mounted stylus holder arm 128. The stylus holder arm 128 is attached to the outside surface of the downwardly extending curved end portion of the arm 124 by means of a machine screw 130 which passes through a helical spring 132 and thence through aligned bolt holes in the lower portion of the stylus holder arm 128 and the aforementioned downwardly curved portion of the arm extension 124.

The top end of the stylus holder arm 128 carries a removable stylus assembly, shown generally at 136, the pointed end of which is pressed by the stylus holder arm into contact with the adjacent surface of a chart 138 carried on the outside cylindrical surface of a rotatable chart drum 152.

The stylus assembly 136 is preferably held in place in the stylus arm by a quick release means which may have a construction similar to that described in the before mentioned copending application Serial No. 688,643 but which in an improved version thereof may be constructed as best illustrated herein in FIGURES 3 to 6 inclusive. Lying flat against the inner face of the stylus holder arm 128 is a short, relatively thin spring holder plate or leaf 162 secured at its lower end to the stylus holder arm by rivets 164 and 165, and with the upper end portion thereof normally free to be sprung laterally from superposition against the adjacent inner face of the stylus holder arm. The upper end portion of the holder leaf 162 extends a short distance beyond the upper end of the holder arm 128, as shown in 170, to facilitate manual manipulation thereof for such spring displacement action. The stylus holder arm 128 has extending through its upper end portion between the inner and outer faces thereof an inverted keyhole-shaped opening 166, formed by interconnected circular and substantially rectangular portions, and spring holder leaf 162 has extending through its upper end portion a similarly shaped upright keyhole-shaped opening 168. The keyhole-shaped openings 166 and 168 are positioned in registration with one another such that the circular portion of keyhole opening 166 lies over the rectangular portion of keyhole opening 168 and vice versa.

Stylus assembly 136 is typically constructed as a ball point type writing unit having an upwardly extending, tubular ink supply reservoir portion 140 connected at its lower end to a conical nosepiece 144 having mounted in the end thereof a writing ball 142, as is shown in enlarged detail in FIGURES 3, 4, 5, and 6. Between the conical nosepiece 144 and ink supply reservoir portion 140 is a stylus head formed with an enlarged circular collar 172 at the base of the conical nosepiece 144, a substantially rectangular neck or body portion having rounded ends and straight parallel sides or flats 174 and 176 extending back from the collar, and a threaded outer end portion 178 extending from the neck portions and interconnecting the stylus head with the reservoir portion 140. The parallel flats 174 and 176 of the neck or body portion are adapted to fit non-rotationally in the rectangular portion of the keyhole-shaped opening 166 of the stylus holder 128, the width of the flats longitudinally of the neck portion being approximately the same as the thickness of the stylus holder arm 128, and the diameter of the collar 172 being such as to be insertable with only slight clearance through the circular portion of the keyhole-shaped openings 166 and 168, but which will not pass through either of the rectangular portions thereof. A threaded, knurled lock nut 180 is carried on the threaded outer portion 178 of the stylus head.

To install the stylus assembly in place in the holder 128, the point 144 and collar 172 are inserted through the circular portion of the keyhole-shaped opening 166 in the stylus holder arm 128, in which position the outer end portion of the conical point 144 extends into the rectangular portion of the keyhole opening 168 of the spring holder leaf 162, but the collar 172 will not pass therethrough. This deflects the upper end of the spring holder leaf 162. When collar 172 has thus been inserted through the circular portion of the keyhole opening 166, the parallel flats 174 and 176 of the neck portion are in alignment with the rectangular portion of the keyhole opening 166 permitting the neck then to be moved upwardly thereinto. As this latter step is completed, collar 172 comes into alignment with the circular portion of the keyhole opening 168 in the holder leaf 162, and the holder leaf 162 is thus permitted to spring back into place against the adjacent inner face of the stylus holder 128 with the circular portion of the keyhole opening 168 then encircling the circular collar 172. The stylus is then thereby held and locked in place in the stylus holder arm. The lock nut 180 is then tightened on threads 178 against the outer face portion of the stylus holder arm 128 surrounding the rectangular portion of the keyhole opening 166, thereby pulling the annular shoulder formed on the inner surface of collar 172 into firm engagement with the opposite surface of the stylus holder arm 128 adjacent the rectangular portion of the keyhole slot 166, thereby securing the stylus rigidly in place in the stylus holder arm.

The ball 142 of the ball point stylus is forced into forceful engagement with the surface of the before mentioned chart 138, such force being suitably adjusted by means of the screw 130 which places the helical spring 132 under compression which, in turn, applies a leverage force upon the base portion of the stylus arm 128 which presses the stylus into forceful contact with the surface of the chart 138 carried on the drum.

The chart 138 is suitably fastened to the outer cylindrical surface of the drum 152 which is rotatably carried on a shaft 154, one end of which shaft is supported in a bearing 156 and the outer end of which is supported in bearings within a clockwork device 158 which also serves to rotate the shaft 154 and, in turn, the drum 152 at a predetermined uniform rate.

It is contemplated that, in operation of the recording apparatus of the invention, two duplicate charts, as shown at 138 and 139 in FIGURE 3, will be superposed one upon the other upon the cylindrical drum 152 with a sheet of carbon paper included between the charts or with the outer chart preferably having a carbon backed surface, whereby with sufficient pressure of the ball point 142 of the stylus on the outer chart surface a carbon duplicate will be traced on the underlying chart. A stylus pressure upon the outer chart surface of approximately 5 ounces has been found necessary for obtaining clear traces upon both of the superimposed charts. It will be noted that the chart 138 is, by way of illustration, graduated from left to right, in accordance with suitable predetermined calibration, in terms of revolutions per minute.

Referring again to the enclosure, shown generally at 33 in FIGURE 1, such enclosure is preferably constructed of heavy gauge sheet metal or steel or aluminum plate and is provided with a top lid 32a. The inside surfaces of the enclosure 33 and lid 32a are covered with layers of heat insulating material, as shown at 35, such heat insulating material being preferably composed of fiberglass blanket material of a thickness of approximately one inch.

Contained within the enclosure 33 is an electrical heating element 184 which is supported by and makes electrical screwed connection into a threaded socket 186 which, in turn, is secured by means of screws 187 and 188 to the bottom of the enclosure 33. Insulated electrical conductors 189 and 190, making connection to the electrical terminals of the socket 186, enter the enclosure wall 32 through a suitably positioned pair of openings 192 and 194. An electrical heating unit which has been found suitable in this connection is a 100 watt Chromalox model No. SCD–100 heating element manufactured by the Edwin L. Wiegand Company, Pittsburgh, Pa.

Also contained within the enclosure 33 is a thermostat 200, such thermostat being preferably supported within the upper portion of the enclosure 33 by attachment to the inside surface of the lid 32a by means of screws 201 and 202. Suitable electrical connections to the thermostat are provided, as shown at 203 and 204, which connections pass out through openings 205 and 206 in the lid 32a. A suitable thermostat for use in this connection has been found to be one manufactured by the Braun Corporation, model No. 61,924.

In operation, the thermostat 200 and heating element 184 are connected in series, as illustrated in the wiring diagram of FIGURE 1A, and such series circuit connected at terminals 210 and 212 to a suitable current supply such as, for example, the conventional 110 volt alternating current power supply lines.

Operation

In operation, the reservoir 44 is filled to a level, as shown at 160, with a suitable fluid, preferably a liquid such as oil, and more preferably a special hydraulic oil, as hereinafter specified. The flexible shaft 16 is coupled to a rotating body, such as for example a shaft suitably geared to a rotary table of a drilling ring or to the shaft of a drilling mud pump or the like device, the rotational speed of which is to be measured and recorded. The fluid pump 10 is thereby driven at a speed which is proportional to the rotational speed to be measured and recorded. Such operation of the pump 10 causes fluid to be withdrawn from the reservoir 44 through the riser tube 40 and into the pump through inlet connection 12, and to be discharged from the pump outlet 14 under pressure through pipe 48, T connection 50, valve 52, and finally through the discharge riser 54 back into the fluid within the reservoir 44.

The valve 52 is adjusted by valve handle 163 to present resistance to flow of fluid therethrough or, in other words, to cause a back pressure or a differential in the circulating fluid pressure across valve 52, such pressure differential being a function of the rate of circulation of the fluid to and from the reservoir 44 by the pump 10. The resultant back pressure appearing in pipe 65 is transmitted therefrom through pipe 66 to the inlet 70 of the head of the pressure actuator unit 72, such pressure acting against the piston area formed by the cross sectional area of the plunger 84 and annular portion of the flexible diaphragm 106 extending between the plunger 84 and the bore 80 of the head member 74. A thrust is thereby imparted to the plunger 84 which is proportional to the before mentioned fluid back pressure across the valve 52, such thrust being opposed by the helical spring 88 acting under compression. As a result of such thrust, the helical spring 88 is deflected lengthwise proportionally to such thrust, with resultant equal displacement of the plunger 98 to the right, as viewed in FIGURE 1, whereby by reason of its pivotal connection at 112 to the stylus arm 14, the stylus arm and the extension arm 124 is caused to be displaced angularly about the pivot 116, thereby causing the resilient stylus holder 128 and the stylus 136 thereon to be likewise moved. The ball point 142 is thus carried across and in forceful contact with the moving chart 138 to make a graphical record thereon indicative of the revolutions per minute of the flexible shaft 16.

The position, range, and magnitude of motion of the stylus 136 across the chart 138 is adjustable by means of valve 52 and also by means of adjustment of the length of the plunger shaft 98 threaded into the end of clevis 110. Additional adjustment of the motion of the stylus 136 can be accomplished by varying the position of the clevis pivot 112 relative to pivot 116 on the stylus arm 114 in the manner and by the mechanism more fully disclosed in copending application Serial No. 688,643. In the making and printing of the charts to be employed as before described, graduations thereon can be initially established by calibration of the movement of the stylus 136 relative to the drum 152, as the speed of rotation of the pump 10 is varied through a known range desired to be measured. During such calibration tests, the setting of the valve 52 to vary the fluid back pressure, and the adjustment of the actuator, as before mentioned, may be varied to bring the sweep of the stylus 136 across the chart 138 within the limits of the width of the chart, and the calibrated positions of a number of speeds of rotation may be established on the chart such as, for example, speeds of 0, 50, 100, 150, 200, and 250 r.p.m., corresponding to those illustrated on the chart in FIGURE 1, or such other range and speed values as are desired to be measured.

In order to maintain the calibrated speed measurements accurate under all conditions, it is necessary to maintain the viscosity of the fluid circulated through the valve 52 by means of the pump 10 constant and to accomplish this, it is necessary to maintain the temperature of the circulated fluid constant. In order to accomplish this under all atmospheric temperatures to which the apparatus of this invention may be subjected, the circulating system including the pump 10 and the valve 52 and reservoir 44 are enclosed within the internally insulated enclosure 33 and a heating unit 184 is provided therein, as hereinbefore described, to supply heat to the interior of the enclosure 33 sufficient to maintain the temperature therein at all times slightly higher than the ambient temperature of the surrounding atmosphere. The action of the thermostat 200 in the circuit, as shown in FIGURE 1A, is adjusted such that it switches the supply current to the heater on and off intermittently as required to maintain such temperature within the enclosure 33 to the approximate required value. Thus, the fluid being circulated by the pump 10 through the valve into and out of the reservoir 44 is maintained at a substantially constant predetermined temperature.

In use of the apparatus of this invention in connection with the measurement of the speed of rotation of a rotary table in a drilling rig, for example, a suitable pump to be employed, as illustrated at 10 in the drawings, has been found to be a positive displacement gear pump manufactured by Eastern Industries, Inc., Hamden, Connecticut, type 1200, having a capacity of approximately 10 gallons per hour at 1000 r.p.m. Operating pressures of the pump over the range of speed of 0 to 250 r.p.m. with the apparatus herein disclosed are approximately 0 to 60 p.s.i. A valve which has been found suitable for use, as illustrated at 52 in the drawings, is a ¼″ needle valve, model 2RB281 manufactured by Hoke, Inc., Cresskill, New Jersey. A suitable liquid for use in the system as hereinbefore described has been found to be a special aircraft hydraulic fluid designated as military specification No. 0–5606 and which is manufactured by a number of well known oil companies.

It is to be understood that the foregoing is illustrative only, and that the invention is not to be limited thereby, but includes all modifications thereof within the scope of definition of the appended claims.

What is claimed is:

1. In a recording tachometer including a stylus means movable relative to a recording surface, apparatus comprising:

a fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means for maintaining the temperature of said fluid pump, said fluid inlet connection, said fluid outlet connection, and fluid supply means at substantially constant temperature;

and means connected to said circulatory system and actuated in response to fluid pressure differential across said flow resistance means for moving said stylus relative to said recording surface in accordance with a given predetermined function of such pressure differential, thereby to make a record on said recording surface which is indicative of said rate of rotation.

2. In a recording tachometer including a stylus means movable across a recording surface, apparatus comprising:

a fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means adjustably to vary the fluid flow resistance of said resistance means;

and means connected to said circulatory system and actuated in response to fluid pressure differential across said flow resistance means for moving said stylus across said recording surface in accordance with a given predetermined function of such pressure differential, thereby to make a record on said recording surface which is indicative of said rate of rotation.

3. In a recording tachometer including a stylus means movable across a recording surface, apparatus comprising:

a fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

actuator means including piston means fluidly connected to said circulatory system, whereby said piston means is subjected to fluid pressure changes resulting from changes in rate of fluid flow through said flow resistance means, to move said piston in accordance with a predetermined function of such changes;

and means coupling said piston means to said stylus to move said stylus across said recording surface in response to movements of said piston means, whereby to make a record on said recording surface which is indicative of said rate of rotation.

4. In a recording tachometer including a stylus means movable across a recording surface, apparatus comprising:

a fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means adjustably to vary the fluid flow resistance of said resistance means;

means including piston means fluidly connected to said circulatory system, whereby said piston means is subjected to fluid pressure changes resulting from changes in rate of fluid flow through said flow resistance means, to move said piston in accordance with a predetermined function of such changes;

and means coupling said piston means to said stylus to move said stylus across said recording surface in response to movements of said piston means, whereby to make a record on said recording surface which is indicative of said rate of rotation.

5. In a recording tachometer including a stylus means movable across a recording surface, apparatus comprising:

a positive displacement fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means adjustably to vary the fluid flow resistance of said resistance means;

actuator means including piston means fluidly connected to said circulatory system, whereby said piston means is subjected to fluid pressure changes resulting from changes in rate of fluid flow through said flow resistance means, to move said piston in accordance with a predetermined function of such changes;

and means coupling said piston means to said stylus to move said stylus across said recording surface in response to movements of said piston means, whereby to make a record on said recording surface which is indicative of said rate of rotation.

6. In a tachometer, apparatus comprising:

drive means;

a fluid pump drivingly connected to said drive means, said pump having a fluid inlet and a fluid outlet;

fluid flow means interconnecting said inlet and said outlet, whereby fluid may be circulated by said pump through said fluid flow means and said pump;

a fluid flow resistance means in said fluid flow means, intermediate said inlet and outlet;

heat insulation means substantially enclosing said pump, said fluid flow means, and said fluid flow resistance means;

means within said insulation means for maintaining the temperature therein substantially constant and means responsive to fluid pressure drop across said flow resistance means for producing a visible indication bearing a predetermined functional relation to said pressure drop, whereby such indication is indicative of the speed of rotation of said drive means.

7. In a tachometer, apparatus comprising:

drive means;

a fluid pump drivingly connected to said drive means, said pump having a fluid inlet and a fluid outlet;

fluid flow means interconnecting said inlet and said outlet, whereby fluid may be circulated by said pump through said fluid flow means and said pump;

fluid flow resistance means in said fluid flow means, intermediate said inlet and outlet;

means for adjusting said fluid flow resistance means to effect different resistances thereof to fluid flow through said fluid flow means;

and indicator means responsive to fluid pressure differential in said fluid flow means across said flow resistance means for producing an indication bearing a predetermined functional relation to said pressure differential, whereby said indication is indicative of the speed of said drive means.

8. In a tachometer, apparatus comprising:

drive means;

a positive displacement fluid pump drivingly connected to said drive means, said pump having a fluid inlet and a fluid outlet;

fluid flow means interconnecting said inlet and said outlet, whereby fluid may be circulated by said pump through said fluid flow means and said pump;

fluid flow resistance means in said fluid flow means, intermediate said inlet and outlet;

means for adjusting said fluid flow resistance means to effect different resistances thereof to fluid flow through said fluid flow means;

and indicator means responsive to fluid pressure differential in said fluid flow means across said flow resistance means for producing an indication bearing a predetermined functional relation to said pressure differential, whereby said indication is indicative of the speed of said drive means.

9. In a recording tachometer including a stylus means movable (relative to) a recording surface, apparatus comprising:

a fluid pump having a fluid inlet connection and a fluid outlet connection;

means for drivingly coupling said pump to a rotating body, the rate of rotation of which is to be measured;

a fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means for maintaining the temperature of said fluid in said circulatory system substantially constant;

and means connected to said circulatory system and actuated in response to fluid pressure differential across said flow resistance means for moving said stylus relative to said recording surface in accordance with a given predetermined function of such pressure differential, thereby to make a record on said recording surface which is indicative of said rate of rotation.

10. In a tachometer including an indicator means movable (relative to) a reference surface, apparatus comprising:

a fluid pump having a fluid inlet connection and a fluid outlet connection;

means for drivingly coupling said pump to a rotating body, the rate of rotation of which is to be measured;

fluid supply means connected to said inlet connection and said outlet connection, whereby fluid may be circulated by said pump through a continuous circulatory system which includes said supply means, said inlet connection, said pump, and said outlet connection;

fluid flow resistance means connected in said circulatory system;

means adjustably to vary the fluid flow resistance of said resistance means;

means for maintaining the temperature of said fluid in said circulatory system substantially constant;

and means connected to said circulatory system and actuated in response to fluid pressure differential across said flow resistance means for moving said indicator means relative to said reference surface in accordance with a given predetermined function of such pressure differential, thereby to make a record on said recording surface which is indicative of said rate of rotation.

References Cited by the Examiner

UNITED STATES PATENTS

| | | | |
|---|---|---|---|
| 356,916 | 2/87 | Boyer | 73—502 |
| 675,654 | 6/01 | Kent et al. | 73—502 |
| 2,300,327 | 10/42 | White | 73—388 |
| 2,545,445 | 3/51 | Chatterton | 137—563 |
| 2,600,324 | 6/52 | Rappaport | 73—388 |
| 2,690,764 | 10/54 | Hoffmann | 137—563 |
| 2,850,350 | 9/58 | Wise et al. | 346—139 |
| 2,937,917 | 5/60 | Anthony | 346—139 |
| 2,982,594 | 5/61 | Riegger et al. | 346—18 |
| 3,013,854 | 12/61 | Vogtlin et al. | 346—18 |

LEYLAND M. MARTIN, *Primary Examiner.*

EMIL G. ANDERSON, LEO SMILOW, *Examiners.*